(12) United States Patent
Tagg (10) Patent No.: US 6,880,006 B1
(45) Date of Patent: Apr. 12, 2005

(54) SYSTEM AND METHOD FOR CONTEXTUAL PASSIVE RULE-BASED NAVIGATION BETWEEN APPLICATIONS SUPPORTING NETWORK-DISCONNECTED USE

(75) Inventor: Bradley S. Tagg, Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/556,963

(22) Filed: Apr. 21, 2000

(51) Int. Cl.$^7$ .............................................. G06F 15/173
(52) U.S. Cl. ................................... 709/225; 719/320
(58) Field of Search ............................... 709/225, 224; 719/320; 706/10, 47; 707/7, 101, 100

(56) References Cited

U.S. PATENT DOCUMENTS

| | | | |
|---|---|---|---|
| 5,216,592 A | | 6/1993 | Mann et al. |
| 5,259,066 A | | 11/1993 | Schmidt |
| 5,572,724 A | | 11/1996 | Watanabe et al. |
| 5,696,915 A | | 12/1997 | Johnston et al. |
| 5,812,847 A | | 9/1998 | Joshi et al. |
| 5,870,727 A | | 2/1999 | Jacques et al. |
| 5,878,258 A | | 3/1999 | Pizi et al. |
| 6,330,564 B1 | * | 12/2001 | Hellerstein et al. .......... 707/101 |
| 6,401,096 B1 | * | 6/2002 | Zellweger ................... 707/100 |
| 6,415,275 B1 | * | 7/2002 | Zahn ........................... 706/47 |
| 6,438,547 B1 | * | 8/2002 | Mehr et al. ..................... 707/7 |
| 6,499,021 B1 | * | 12/2002 | Abu-Hakima ................ 706/10 |
| 6,557,035 B1 | * | 4/2003 | McKnight .................... 709/224 |

OTHER PUBLICATIONS

Kiger, Expert System & Lotus Notes applications for Retrieval of problem–solving Knowledge & Information, IEEE, 1996.*
Reinwald et al, "Structured Workflow Management with Lotus Notes Release 4", IEEE, 1996.*
Vandenbosch et al, "Lotus Notes and Collaboration: Le plus ca change", IEEE, 1996.*

* cited by examiner

*Primary Examiner*—John Follansbee
*Assistant Examiner*—Jungwon Chang
(74) *Attorney, Agent, or Firm*—Scully, Scott, Murphy & Presser; William E. Schiesser, Esq.

(57) ABSTRACT

A system and method for navigating between two or more programs, each program capable of being instantiated to form a program instance. The method includes the steps of: embedding and enabling engine in an origin program and instantiating the origin program; invoking the enabling engine for the origin program instance, which is responsive to the origin program instance; interrogating a rule-base and retrieving one or more conditions associated with the origin program instance; utilizing the one or more conditions to query and evaluate data managed by the origin program instance; establishing and displaying one or more navigation paths to a user via a graphical display by utilizing results of the evaluation; enabling the user selection of a navigation path from the one or more navigation paths thus displayed; and instantiating a target program associated with the navigation path selected by the user and traversing to the target program instance by utilizing.

42 Claims, 10 Drawing Sheets

SYSTEM AND METHOD FOR CONTEXTUAL PASSIVE RULE-BASED NAVIGATION BETWEEN APPLICATIONS SUPPORTING NETWORK-DISCONNECTED USE

BACKGROUND OF THE INVENTION

1. Technical Field of the Invention

The instant invention relates generally to computer systems, and more particularly, to a method and apparatus for providing an interface for contextual passive rule-based navigation between computer application programs and components thereof, supporting network navigation and network-disconnected use.

2. Background of the Invention

In the decade preceding the second millennium, computer technology has seen its largest growth spurt, with computers being smaller, cheaper, faster and available to everyone. Application programs that run on these machines span the gamut from the very mundane to the very complex. Invariably, it application programs are developed or used to accomplish certain sets specifically related tasks, whether they would be word processing, data management, desktop publishing, or communications. Further yet, application programs are logically correlated to the sets of specific tasks to be performed. Inevitably, these application programs are developed separately as stand-alone programs, which often consist of separately-executable components, in order to facilitate each of the specifically related tasks.

Today, organizations must necessarily obtain and manage large amounts of information to enable them to operate, make effective business decisions and plan strategies. In this regard, a very effective application program is a database management system (DBMS). There are a variety of database management systems available in the marketplace. Lotus Notes® is one of the most popular object-based database management systems in use today and particularly in use by the present assignee. It is a full-featured, robust groupware application developed by Lotus, which is now part of IBM. Lotus Notes® is a client-server platform that enables users to access, share and manage information over a network. Lotus Notes® supports access to a plurality of distributed databases of documents by users across a network. Lotus Notes® particularly enables users to create document databases, post them to a network and share them with their coworkers. Its sophisticated replication enables users to work with local copies of documents and have their modifications propagated throughout the entire Lotus Notes® network. Lotus Notes® additionally facilitates users to access network databases including collections of related documents, such as forms, reports, lists, articles and other information. The documents may contain text, graphics, pictures and other types of data. Lotus Notes® is additionally e-mail enabled, facilitating not only the sharing of databases of documents, but electronic mail as well.

A Lotus Notes® client is composed of a workspace of pages, wherein each workspace page holds databases of documents as well as other information. Workspace pages are similar to file folders in that each page may be optionally named, and comprises an area into which a user can place databases and other related information.

As aforementioned, in Lotus Notes®, related documents are stored in databases. For example, a user may create an address book database that contains the names, addresses and telephones of clients. Another often-used database is a mailbox database, which contains a collection of documents a user has sent or received. A user may access databases, which were created locally by the user or by a network administrator and which are available on a network server.

In database management systems, a view is a particular way of viewing a database. Typically, a view arranges records of the database in some order and makes only certain fields of the database visible. The different views do not affect the physical organization of the underlying database. A single database can support numerous views.

An organization may develop its own or use commercially-developed application programs for certain sets of specific tasks. Often, separately-developed application programs need to be utilized in seamless conjunction with or succession to one another to enable efficient workflow. The pervasive use of computers, networks and e-mail has made it possible to automate certain aspects of workflow. Word processing application programs provide excellent means for replacing paper with electronic formats. Databases provide means for storing and organizing vast amounts of information that used to reside in file cabinets. Networking has spawned e-mail, which in turn provides an excellent and almost instantaneous means of routing information within the organization and throughout the world. Finally, the inherent computing capabilities of computers provide a virtually unlimited resource to control the workflow process.

However, navigating through the many separately-developed application programs facilitating efficient workflow remains at best problematic. Therefore, what is needed, especially given today's dynamic nature of computing and number of application programs, is a system, which enables seamless navigation between a plurality of separately-developed computer application programs, and which facilitates efficient workflow. It is also highly desirable that such a system provide navigation based on a context associated with a particular program instance.

Furthermore, it also is highly desirable that the system be passive in nature facilitating a user's selection of a navigation path and not forcing the user into a discrete path.

However, the prior art DBMS systems have not filled this void when it comes to enabling passive contextual rule-based navigation between separately-developed application programs. The related prior art systems are herein illustrated.

3. Description of the Prior Art

U.S. Pat. No. 5,878,258 is directed to a concept of controlling computer applications, providing for a seamless interface management system (shell program), for use on computer workstations, permitting seamless integration of distinct applications within a common operating system. The shell program is a pre-defined user interface structure for access and control of the applications, which communicates with the applications via OLE (object linking and embedding) automatic transfer mechanisms.

U.S. Pat. No. 5,870,727 is directed to a rule-based system for the provision of complex navigational logic, automatically controlling the presentation of screen displays at the graphical user interface of a Client workstation, in a Client/Server environment. The system addresses rule-based navigation with a single Client workstation application.

U.S. Pat. No. 5,572,724 discloses a system for controlling communications in distributed systems, between an application and a remote system using a protocol identifier and an application context identifier, to realize the easy establishment of a communication path.

U.S. Pat. No. 5,696,915 discloses a method and apparatus for associating routines for controlling user actions in a computer-controlled display system, aimed at manipulation of an element of a graphical user interface using contexts.

U.S. Pat. No. 5,259,066 discloses a mathematically-based method for creating complete and consistent rule bases for use in expert systems, which are computer programs that provide the skill of an expert in a defied area of expertise, during inference processing.

U.S. Pat. No. 5,812,847 is directed to rule-based method for designing graphic user interfaces for computer applications, wherein time-consuming re-compilation and reloading of the application program is avoided whenever the associated graphical 120 user interface for a particular application program changes.

U.S. Pat. No. 5,216,592 discloses a system and method for business process automation, where the said system and method allow for rapid creation of a specific data processing system based upon a series of generic process rules that are previously developed and stored in the system.

Based on the aforementioned prior art, it has heretofore not been possible to seamlessly navigate between a plurality of application programs without requiring the hard-coding of a rule-base into the individual computer application program. The hard-coding of the rule-base into each computer application program requires redistribution of the application program whenever the rules are changed. Therefore, it is additionally highly desirable to be able to navigate between a plurality of application programs without the necessity of hard-coding a rule-base into each application program.

The design, development and coding of these application programs represent a significant investment of resources. In conventional programming, the application program must be modified in order to change the embedded hard-coded segments of code. Thus, it is also highly desirable to have a system that allows for dynamic rule-base management, which facilitates rule-base modification without actually modifying the application programs utilizing the rule-base, therefore, escaping the hard-coding requirements.

SUMMARY OF THE INVENTION

It is an object of the present invention to provide a computer graphics interface that enables a user to perform a variety of tasks, which require the implementation of one or more separately-developed computer application programs or separately executable components thereof, in a way which provides for contextual passive rule-based navigation between the application programs and facilitates efficient workflow, supporting network navigation and network-disconnected use.

It is another object of the present invention to facilitate navigation between application programs without requiring the hard-coding of navigation points into the individual application programs.

It is still another object of the present invention to facilitate navigation between application programs without requiring the hard-coding of a rule-base into the individual application programs.

Yet, another object of the present invention to allow for dynamic rule-base management facilitating rule-base modification without modification of the application programs utilizing the rule-base.

The foregoing objects are realized in a contextual passive rule-based navigation system according to the present invention. According to a preferred embodiment of the present invention, there is provided a method for seamless navigation between two or more programs, each program capable of being instantiated to form a program instance, the method comprising the steps of: embedding an enabling engine in an origin program and instantiating the origin program; invoking the enabling engine for the origin program instance, which is responsive to the origin program instance; interrogating a rule-base and retrieving one or more conditions associated with the origin application instance; utilizing the one or more conditions to query and evaluate data managed by the origin program instance; establishing and displaying one or more navigation paths to a user via a graphical display by utilizing results of the evaluation; enabling the user selection of a navigation path from the one or more navigation paths thus displayed; and instantiating a target program, which is a function of the user selection of the navigation path, and traversing to the target program instance.

Further features, aspects and advantages of the present invention as well as the structure and operation of preferred embodiments of the present invention will become better understood with regard to the following description, appended claims, and accompanying drawings.

DETAILED DESCRIPTION OF THE PREFERRED EMBODIMENT OF THE PRESENT INVENTION

The present invention is directed to a system and method for navigating between separately-developed application programs based on an application program context, whereby rules that are separately developed use information managed by the application program as input into decisions that determine possible points of navigation made available to a user. The application program context comprises several elements: 1) a user; 2) an instance of an application program being executed by the user; 3) data managed by the application program instance; 4) role data for the user, i.e., allowable activities for the user; and 5) a time factor, i.e., time limit that delimits the duration during which the application program context is valid. Further, the present invention is passive in nature because it does not force navigation between possible points of navigation (i.e., between applications), but rather allows the user to select the navigation point from a generated list of navigation points determined to be available by the present invention.

A preferred embodiment of the present invention is implemented in Lotus Notes® and the enabling engine is implemented utilizing Lotus Notes Script®. The enabling engine is provided to application programs as an embeddable Lotus Notes® sub-form and corresponding agent/event code. A sub-form is a re-usable form component that contains presentation and logic elements, which are embedded into other forms to achieve reusability. The logic is packaged as agents, which respond to events pertaining to the application program (i.e., form) in which they are embedded, as well as to the sub-from itself. The rule-base is implemented as a Lotus Notes® database, with functionality provided through Lotus Notes Script®. It should be understood that a rule is a combination of: 1) a condition, defining some combination of binary events that must be met for the rule to apply; 2) an action, defining the action (e.g., navigation) to be performed if the rule applies; and 3) an identifier indicating what application instance the rule is associated with, such that only application instances that are associated with the rule are related to the rule. The embeddable enabling engine communicates with the rule base via Lotus Notes® API calls. It should be understood by those of ordinary skill in the art that many different embodiments may be developed without deviating from the scope and intent of the present invention.

Figure 1:
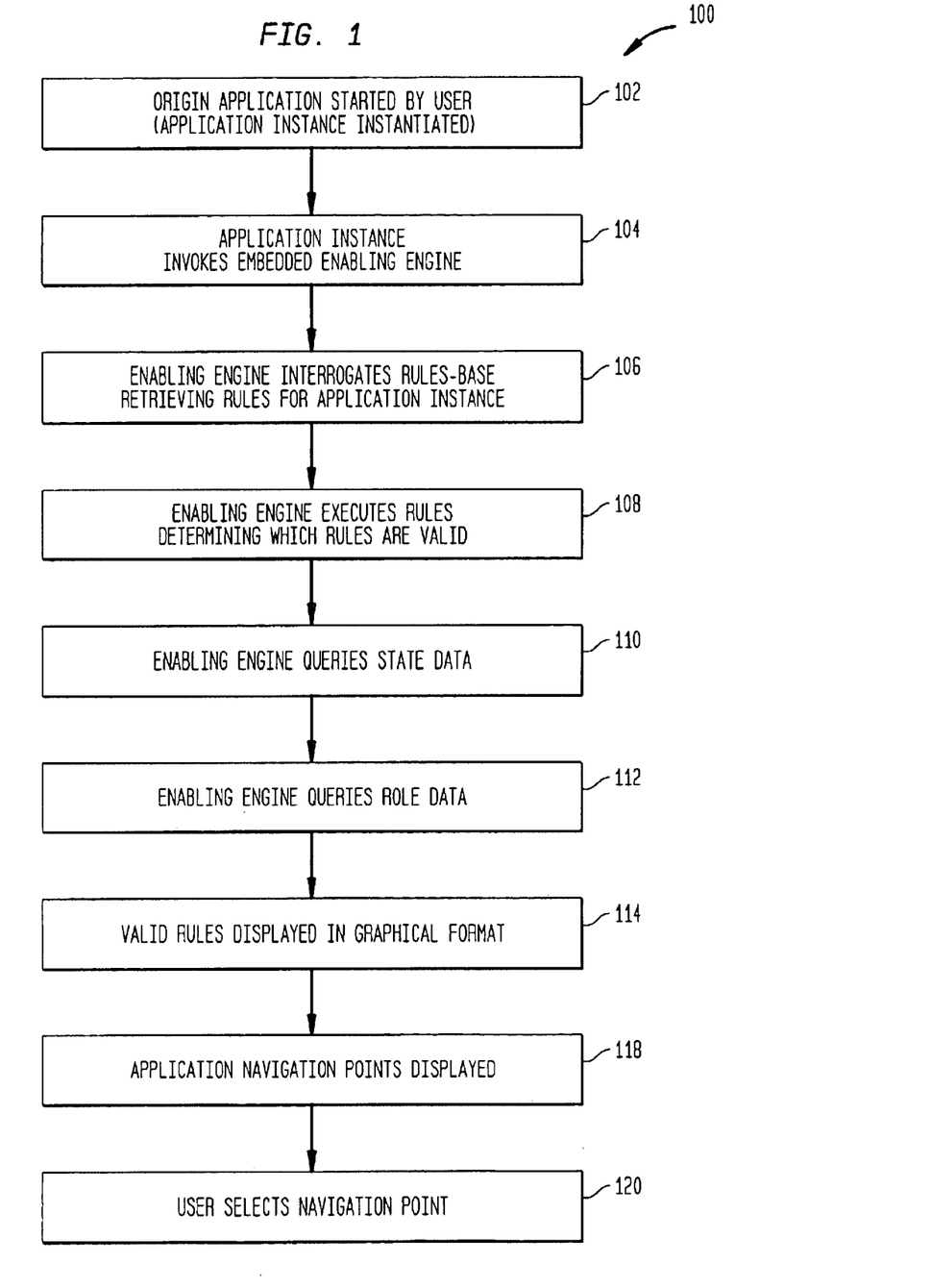
FIG. 1 is an exemplary run-time flowchart of the present invention.

FIG. 1 is an exemplary run-time flowchart 100 of the present invention, which sequentially illustrates the run-time steps of the present invention. More specifically, an application program is instantiated at step 102 by a user starting a particular application program, thereby creating an application instance. An application instance is a specific in-memory copy of a stored application program which is presently running on a computer. With reference to the present invention, it should be understood that the application program is configured to use an enabling engine consistent with the teachings of the present invention described herein below. The application instance invokes the embedded enabling engine at step 104, which is responsive to the application instance. At step 106, the enabling engine interrogates a rule-base, which contains rules that are available to the application instance, and retrieves these rules. That is, the rule-base contains rules one or more of which is associated with the instance of the application, thereby comprising application instance information. Then, the embedded enabling engine executes the rules thus retrieved, determining which rules are valid at step 108, and which are later displayed to the user in graphical format (e.g., a listbox) via step 114. Furthermore, the enabling engine queries both the state data at step 110 and the role data at step 112 of the present application instance. Additionally, the user's network connectivity status is determined, i.e., whether or not the user is connected to a network. As will be described in greater detail, utilizing the state data and role data, network connectivity status, valid rules and time constraints, the application instance graphically displays (e.g., in a listbox) the navigation paths that are available based on the aforementioned criteria at step 118. It should be noted that if the user is not connected to the network, then the enabling engine interrogates the user's local system to determine if the points of navigation are available locally. For a non-connected user, a navigation point must be available on the user's local system before it is made available. Once available navigation points are displayed, the user selects a navigation path from the graphical display at step 120.

Figure 2:
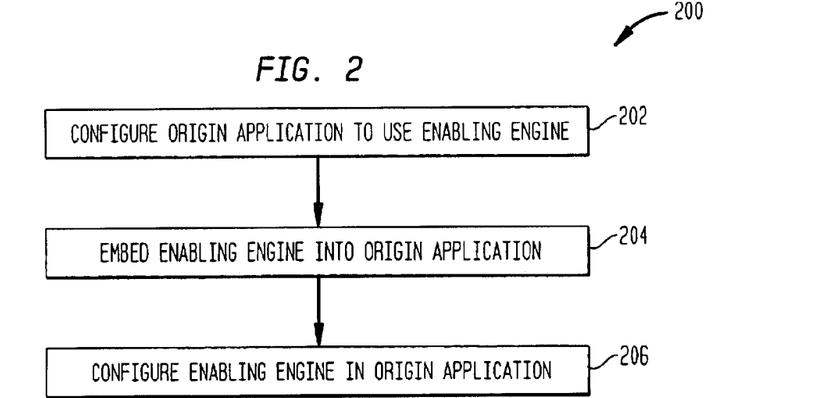
FIG. 2 is an exemplary build-time flowchart of the present invention.

FIG. 2 is an exemplary build-time flowchart 200 illustrating how an enabling engine may be embedded in an application program to enable seamless navigation according to the principles of the present invention. The first step involved in setting up the application program, is to configure the application program to use the enabling engine 202. It should be understood by those of ordinary skill in the art that this step may be performed in a plurality of ways. In an exemplary fashion, a Lotus Notes® sub-form may be provided to the application program. Sub-forms are created as re-usable and embeddable components of forms, which are shared by application developers who want to reuse the sub-forms. The sharing and re-usability of sub-forms is accomplished via the use of a Lotus Notes® code library. Alternatively, this can be accomplished by specifying an executable (*.exe) program name of the enabling engine to the application program, where the application program stores the name and can execute it. In the preferred embodiment of the present invention, the application further needs to be put into edit mode to work correctly with the enabling engine. The next step 204 is to embed the enabling engine into the application program. This step can be performed by placing design elements into a database of the application program. Design elements may be forms, sub-forms, views, agents es script libraries and navigators necessary for correct performance of the enabling engine. The next step 206 is to configure the enabling engine in the application program.

In the aforementioned build-time flowchart 200, steps 202 . . . 206 are performed by application developers during the creation or modification of an application program. In the preferred embodiment of the present invention, the developer uses functions in the Lotus Notes development environment to locate the enabling engine as a re-usable sub-form. Once located, the developer embeds the enabling engine, which comprises both a user interface and programming logic, into an application program by appending it into the application program. In the preferred embodiment of the present invention, this is done by copying the sub-form (i.e., representing both the user interface and the related logic) into a form of the application program that is being enabled. Typically the sub-form is embedded in a prominent display area of the application program, so that the navigation capabilities are evident to a user. The user of the application program being enabled inherits the functionality provided by the enabling engine (i.e., querying of related rules and derivation of potential navigation paths).

Figure 3:
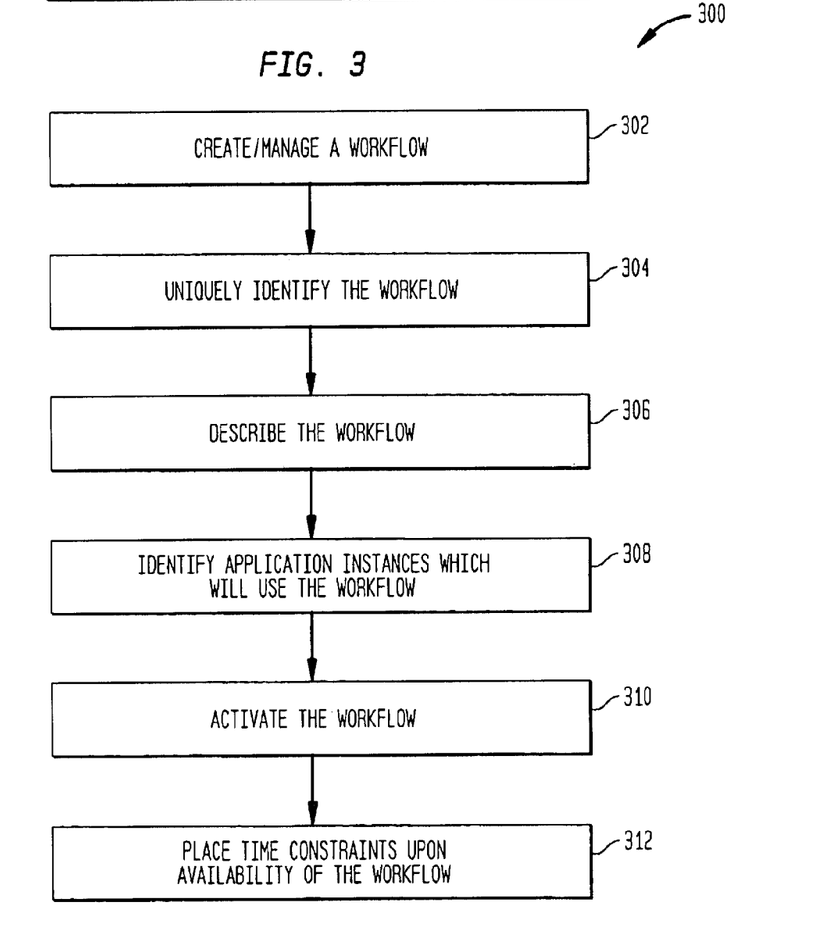
FIG. 3 is an exemplary flowchart of how the present invention creates and manages workflow definitions.

FIG. 3 is an exemplary flowchart of a process 300 via which the present invention creates and manages workflow definitions, i.e., one or more rules for the workflow. A workflow definition represents an aggregation of rules that will be treated as one entity, allowing certain actions (e.g., navigate, activate, etc.) that work in conjunction with the one or more rules, thereby comprising the workflow. The present inventions provides a facility for iterative development of rules without the necessity of placement of the rules into the application with which they are associated. Furthermore, the workflow definition can be established in a way, which facilitates performance of a workflow a sequential manner. It should be understood by those of ordinary skill in the art that a workflow process 300 supports creation of rules for navigation between application programs and that the workflow process 300 allows management (e.g., update, query and delete functionality) of navigation rules that pertain directly to an instance of an application program that embeds the enabling engine of the present invention. Referring to workflow process 300, step 302 allows for management of a workflow, including creation, update, query and deletion of the workflow. At Step 304, the workflow process 300 is uniquely identified and the workflow is described at step 306. One of the most important steps is to identify the application instance or instances, which employ the workflow, i.e., the aggregation of workflow rules. The application instance or instances are associated to the workflow at 308. Once the workflow is associated to application instance or instances, the workflow can either be set to an active status or an inactive status at step 310. It should be noted that an active status makes the workflow available for use by the application instance with which it is associated. Conversely, an inactive status makes the workflow unavailable for the application instance with which it is associated at step 308. A workflow is active for a period of time particularly specified at step 312, but only if the status of the workflow is set to active. Thus, for example, if a workflow is set to active, a time constraint in terms of calendar dates (e.g., March 1 through March 31) is placed upon time during which the workflow is active. It should be noted that time constraints for the workflow are modifiable and are consistent with particular business requirements.

Figure 4:
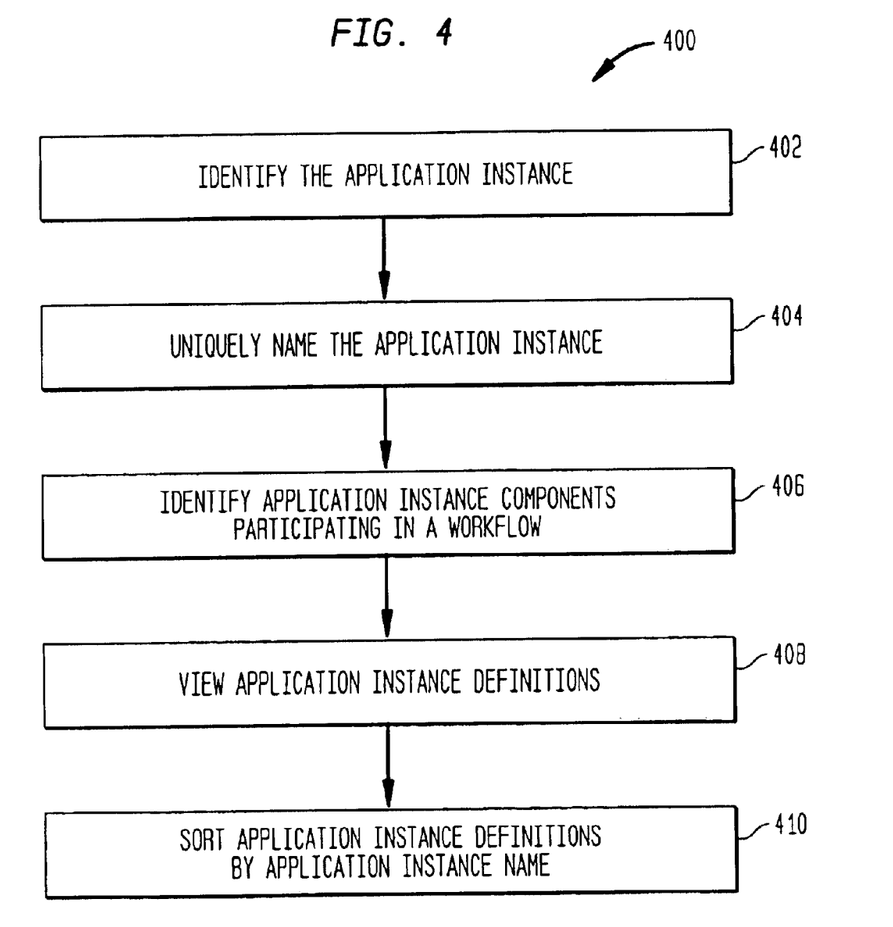
FIG. 4 is an exemplary flowchart of how the present invention creates and manages application instance definitions.

FIG. 4 is an exemplary flowchart of a process 400 via which the present invention creates and manages application instance definitions. It should be understood by persons of ordinary skill in the art that an application instance represents an application program that is currently executing, and particularly with regard to the present invention, one which is embedded with an enabling engine. In this process 400, functionality is provided for displaying, selecting, creating, updating and deleting application instances. Referring to process 400, step 402 identifies the application instance by associating a unique identifier with an instance of an application. At step 404, the application instance is given a unique name (e.g., a descriptive name). It should be noted that any unique name, which can later be used to refer to the instance is acceptable. Once the application instance is descriptively named, components that participate in the workflow are identified at step 406 and are made available to the application instance. It should be noted that a particular application program may consist of one or more separately executable components. For example, a word-processing program (e.g., Word for Windows) comprises, among other integrated components, a separately executable "spell check" component, which the enabling engine of the present invention can launch. Some application programs are monolithic and do not allow external launch of a specific integrated component. However, most of the contemporary application programs expose separately executable components, which can be externally launched through programming logic provided by the enabling engine of the present invention. The process 400 provides functionality for viewing application instance definitions at step 408. At step 410, the application instance definitions are sorted by name for ease in retrieving and modifying of the application instance definitions.

Figure 5:
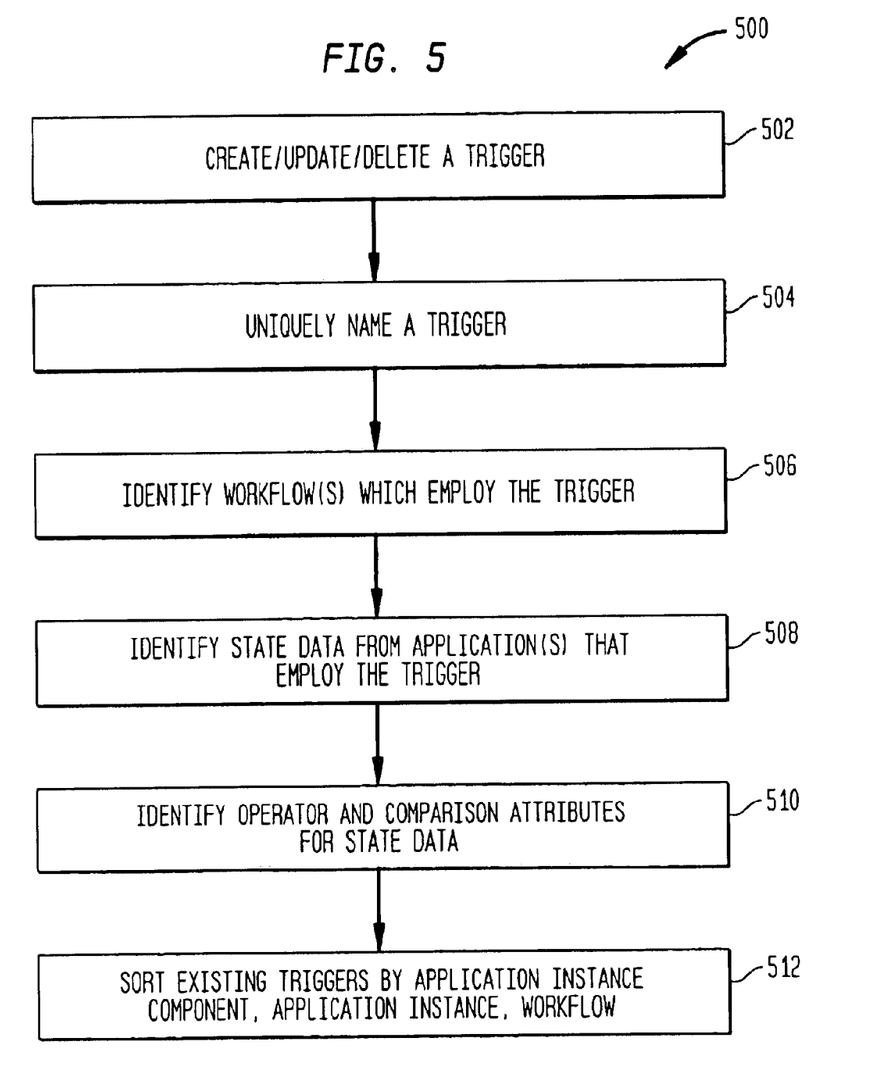
FIG. 5 is an exemplary flowchart of how the present invention creates and manages triggers.

FIG. 5 is an exemplary flowchart of process 500 by which the present invention creates and manages triggers. Insofar as the present invention is concerned, a trigger is a mechanism via which one or more conditions are defined, and which must be satisfied for a rule of the present invention to become available as a navigation point. That is, the rule is comprised of one or more conditions that are evaluated against application instance data. For example, the following describes a condition for a trigger, wherein the field 'Status' is compared against the value 'Closed': Status='Closed'. This level of abstraction provides an easy means to modify the condition for the trigger definition, such as the case where the field 'Status' can easily be redefined to be compared against value 'Filed': 'Status'='Filed'.

Therefore, all rules that employ the aforementioned trigger automatically use the redefined trigger definition. Additionally, it should be understood by persons of ordinary skill in the art that a trigger can be stored in a trigger file or a trigger document. The preferred embodiment of the present invention utilizes a trigger document that specifies which values in a field in a particular database associated with an application instance will act as a trigger thereby satisfying the concomitant condition for the rule to become available. The process 500 depicted in FIG. 5 provides functionality for displaying, selecting, creating, updating and deleting triggers. Referring to process 500, step 502 enables the present invention to manage triggers, i.e., create, update and delete triggers. At Step 504, a trigger is given a unique descriptive name to facilitate future reference by developers of rules and triggers. Step 506 identifies a workflow (or workflows) in which the trigger is used. The trigger is associated with a workflow identifier, depicted in FIG. 3, step 304, so that actions initiated against the workflow apply to the trigger as well. That is, associating triggers to a workflow provides an ability to assess all triggers of the workflow when modifications of the workflow need to be implemented. At step 508, state data from an application instance is identified, which is used in the trigger. State data (i.e., database fields and concomitant field values) that application instance manages, are identified as participating in a logical comparison that defines the condition to be met by the trigger. Once state data are identified, a logical operator and comparison attributes for the state data are identified at step 510. A logical operator, e.g., "=", representing equivalency is combined with comparison attributes that identify fields and values that will be used in comparisons against the aforementioned state data. For example, a trigger can be defined for checking a field called 'Status' located in a database managed by an application instance, against comparison attribute, such as 'Complete' by using a logical operator such as '=', and if the comparison is true the present invention is enabled to display a navigation point. It should be understood that more complex triggers may be created depending upon particular business requirements. At step 512, the process 500 sorts the existing triggers by application instance component, further by application instance, and lastly by workflow.

Figure 6:
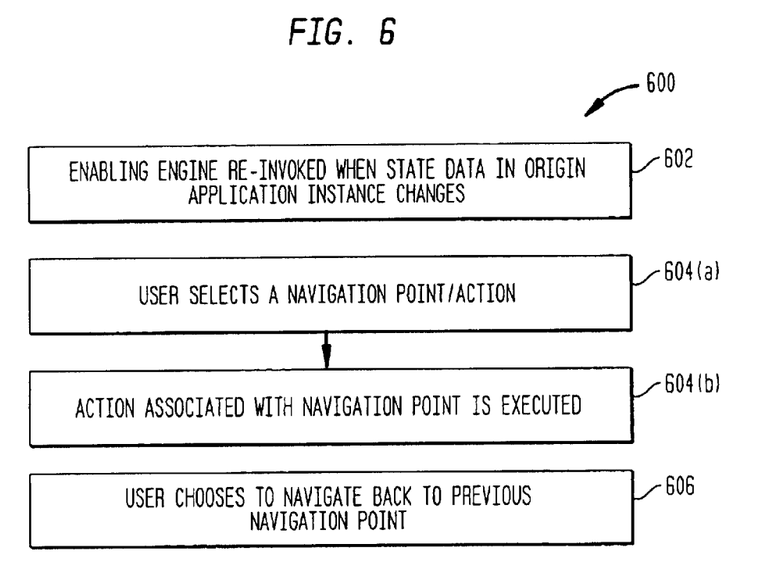
FIG. 6 is an exemplary flowchart of run-time operations by the enabling engine of the present invention.

FIG. 6 is an exemplary flowchart of run-time process 600 implemented by the enabling engine of the present invention and particularly describes the capabilities of the enabling engine as it operates within an application instance which is currently active.

As shown in FIG. 6, there are provided three processing threads, which are supported by the enabling engine of the present invention. A first sub-processing thread is an application instance state data change thread 602. Upon key events, where state data in the application instance that is currently active change, the enabling engine is re-invoked and performs processing steps that were performed by the enabling engine when the enabling engine was originally invoked at FIG. 1, step 104 by the application instance. That is, the enabling engine performs steps 106 through 112 depicted in FIG. 1.

A second sub-processing thread is a user navigation thread depicted at steps 604(a)–604(b). At step 604(a), which is synonymous with FIG. 1, step 120, the user first selects a navigation point from a graphical display provided by the enabling engine of the present invention. Upon user selection of a navigation path, the enabling engine of the present invention performs an action 604(b) associated with the navigation path the user selected. The action that is associated with a navigation point (e.g., a launch) is executed, with the concomitant result being an instantiation of an application (or any component thereof) associated with the action selected by the user at step 604(a) and the user's traverse to the application instance. It should be noted that the enabling engine of the present invention stores the navigation point associated with the present application instance in a stack-like structure (i.e., alternate methods of storage can be provided) to enable navigation back via step 606. In the preferred embodiment of the present invention, the action associated with a navigation point is enabled via programming logic written in Lotus Notes Script® and that is executable by a Lotus Notes Script® run-time environment.

A third sub-processing thread is a user navigation backward thread 606. That is, once the application associated with the action is instantiated in the second processing thread 604(a), the user may choose to navigate back to the user's prior application instance via the enabling engine's graphical display, which is updated with a navigation point to the prior application instance. Furthermore, it should be noted that the enabling engine of the present invention is enabled repeatedly to navigate to the prior application instance as many times as the user navigated in the forward direction via steps 604(a) and 604(b), by stacking each successive navigation point to the prior application instance on a stack and popping it off the stack when the user chooses to navigate back to the prior application instance associated with the last popped navigation point.

Figure 7:
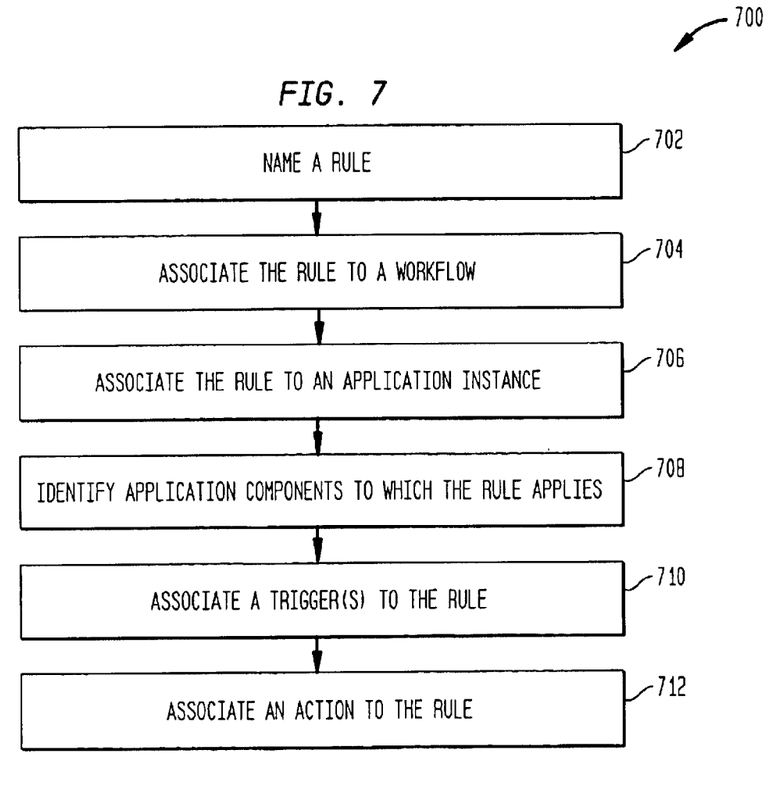
FIG. 7 is an exemplary flowchart of how the present invention creates and manages rules.

FIG. 7 is an exemplary flowchart of a process 700, which enables the present invention to create and manages rules. It should be noted that a rule is a combination of one or more triggers and associated actions (i.e., set of steps to perform) when the trigger is evaluated. That is, the rules specifies actions to be performed if a particular trigger is satisfied. Rules are made available to a user for selection as navigation points. The process 700 provides functionality for displaying, selecting, creating and deleting rules. It should be understood by persons of ordinary skill in the art that the rules may be stored in a database or a rules document. At step 702, a rule is given a unique descriptive name. The rule is associated to a workflow (i.e., FIG. 3, step 304) at step 704, thereby defining the rule as part of a workflow definition, such that actions performed against the workflow apply to this rule. Step 706 associates the rule to an application instance (i.e., FIG. 4, step 404). This step effectively binds the rule to an application instance and makes the embedded enabling engine in the application instance recognize this rule as applying to the application instance. At step 708, the application instance components to which the rule applies are identified. That is, B the rule is associated to a component of the application instance, i.e. any separately executable element of the application instance to which the application instance can navigate and pass parameters. The next step is to associate trigger or triggers to the rule at step 710. The rule is built by associating multiple triggers (FIG. 5, step 504). If there are multiple triggers, the triggers are combined together with operators to define the conditions that must be met for the rule to become "active", (i.e., available as a navigation point to the user). Step 712 associates an action to be performed to the rule. An action is chosen, as will be described herein with respect to FIG. 9, and is executed for the rule whenever the trigger becomes valid, i.e., all conditions of the trigger are met.

Figure 8:
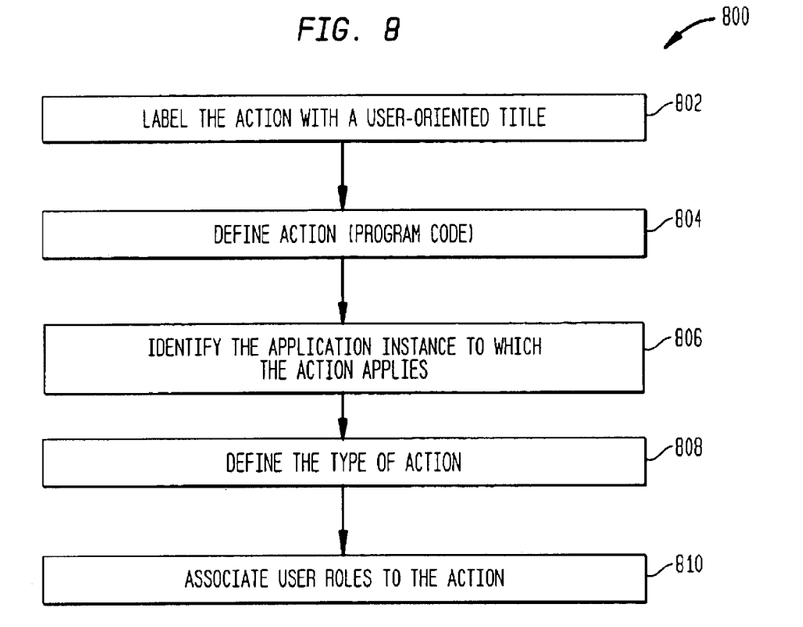
FIG. 8 is an exemplary flowchart of how the present invention creates and manages navigation actions.

FIG. 8 is an exemplary flowchart of the process 800 via which the present invention creates and manages navigation actions. This process provides the capability of creating and managing navigation actions. Navigation actions are steps to be taken when the conditions of a trigger for a rule are met. The actions are managed as discrete, atomic units that can be used by one or more rules. The process 800 provides functionality for displaying, selecting, creating, updating and deleting actions. Step 802 provides for labeling the action with a user-oriented title. That is, the navigation action to be performed is annotated with a specific descriptive name that will be displayed (e.g., FIG. 9) to the user when the conditions of the rule are met. This name indicates to the user the navigation action that will be performed if the user selects a navigation action. At step 804, the process defines the action in terms of program code to be executed. That is, the program code that will be executed to achieve the navigation action is defined and associated with the action. In the preferred embodiment of the present invention, the program code is Lotus Notes Script®. At step 806, an application which applies to this navigation action is identified. That is, the application to which the rule applies is identified so that the rule is known to that application. At step 808, the type of action to be performed is defined. That is, a navigation action is defined as either: 1) a launch of an executable program; (2) a launch-create, wherein an executable is launched and an object, such as a document is created; and 3) a mail action, wherein a mail element is sent to a defined set of users (Lotus Notes® supports a "send mail" component of a mail program, which receives a mail template input). At step 810, user roles are defined and associated to the action. That is, groups of users that can have access to the action are identified.

Figure 9:
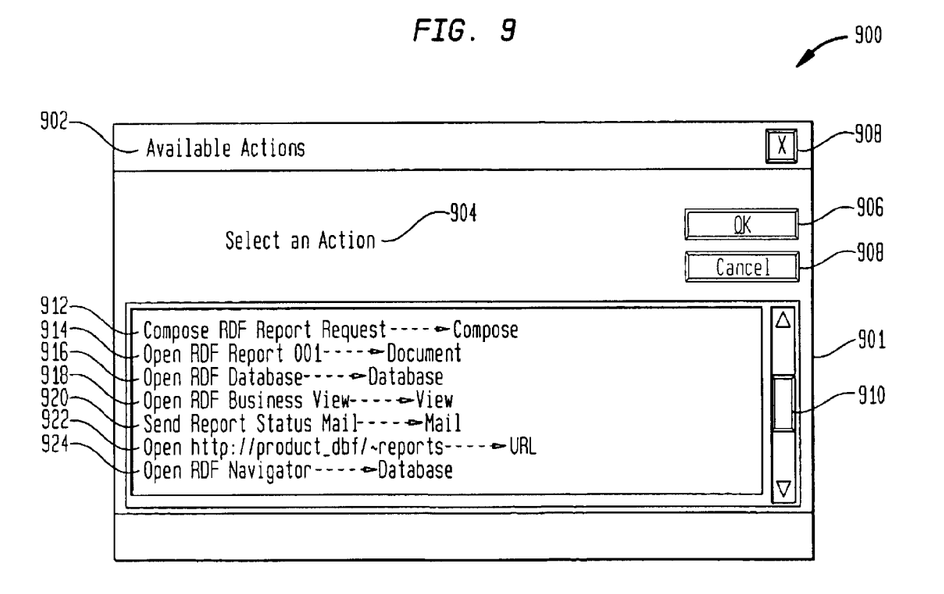
FIG. 9 is an exemplary graphical interface displaying navigation paths generated by the present invention.

FIG. 9 is an illustration of a graphical interface 900, which displays exemplary navigation paths in the manner according to the present invention. More specifically, based upon the above-mentioned state and role data, valid rules and time constraints, the application instance displays a dialog box 900, which lists all the available navigation paths 912, . . . , 924 to the user. The dialog box 901 represents available actions 902 that the user may perform from the user's current position (i.e., current application instance). The dialog box 901 prompts 904 the user to select a navigation paths from the generated list 910. The dialog box contains an "OK" 906 and "Cancel" 908 buttons, so that the user can select a navigation path or cancel the dialog box. Notice, that the user is not forced to make a selection of a navigation path. It should be noted that each of the generated navigation paths represents a separately-developed application program and/or a component thereof, which represents a portion of a workflow. Thus, the present invention allows the user to navigate between applications. As illustrated in FIG. 9, the user can select a navigation path, which opens a specified document 914, a view 918 or a database 916 in another application. Furthermore, the user is able to send mail 920, which opens a template in a database. The user can further launch a web browser application by selecting a navigation path, which launches the web browser and opens the specified URL 922. The user can compose a new document in a target database 912 or open a navigator in another application 924.

Figure 10:
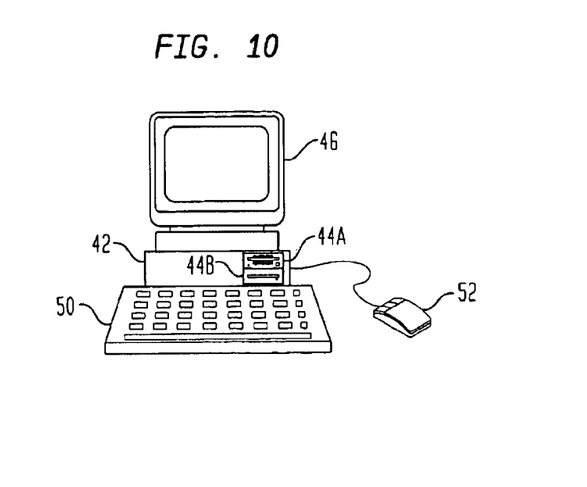
FIG. 10 is an exemplary illustration of a computer of a type that may be used to practice the present invention.

As will be understood by those persons of ordinary skill in the art, the present invention may be carried out on any suitable computer or computer network. FIG. 10 illustrates, as an example, a computer of a type that may be used in the practice of this invention. Viewed externally in FIG. 10, a computer system has a central processing unit (CPU) 42 having disk drives 44A and 44B. Disk drive indications merely are symbolic of a number of disk drives that might be accommodated by the computer system. Typically, these would include a floppy drive such as 44A, a hard disk drive (not shown externally) and a CD-ROM drive indicated by slot 44B. The number and type of drives vary, usually, with different computer and network configurations. The computer has display 46 upon which information is displayed. A keyboard 50 and a mouse 52 are normally also available as input devices an are interfaced to the system bus 54 via interface 58.

Figure 11:
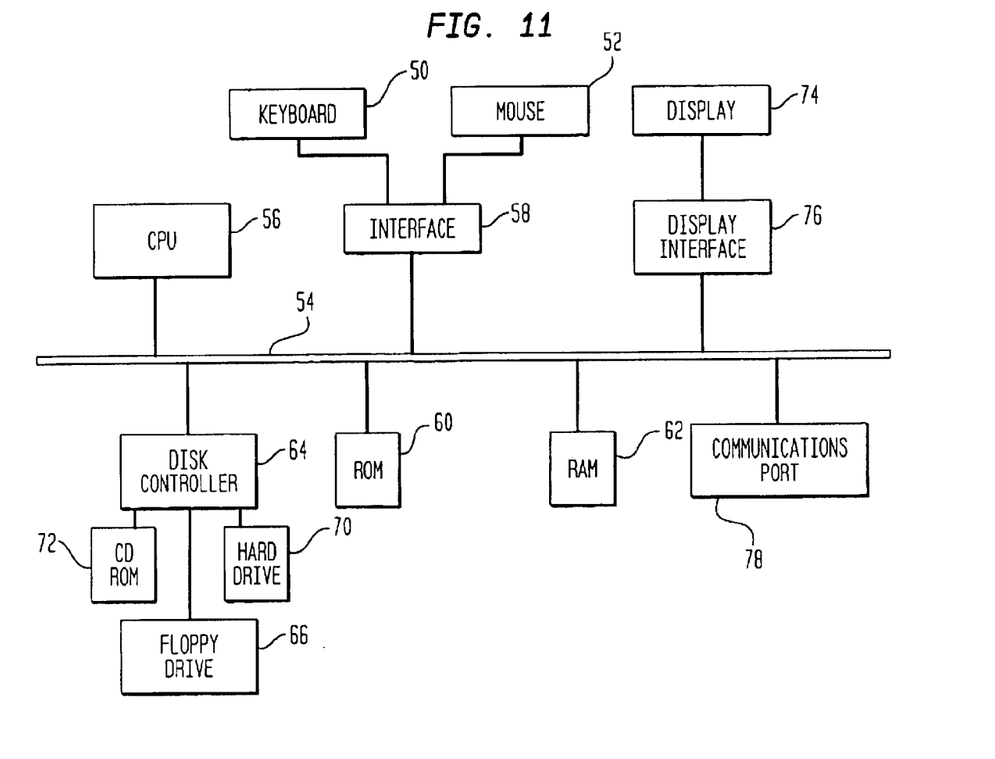
FIG. 11 is an exemplary block diagram of internal hardware of the computer depicted in FIG. 10.

FIG. 11 shows a block diagram of internal hardware of the computer depicted in FIG. 10. A bus 54 serves as the main information highway, interconnecting other components of the computer. CPU 56 is the central processing unit of the system, performing calculations and logic operations required to execute programs. Read only memory (ROM) 60 and random access memory (RAM) 62 constitute the main memory of the computer. Disk controller 64 interfaces one or more disk drives to the system bus 54. These disk drives may be floppy disk drives, such as 66, internal or internal hard drives, such as 70, or CD-ROM or DVD (Digital Video Disk) drives, such as 72. A display interface 74 interfaces a display 76 and permits information from the bus to be viewed on the display. Communications with external devices can occur over communications port 78.

Figure 12:
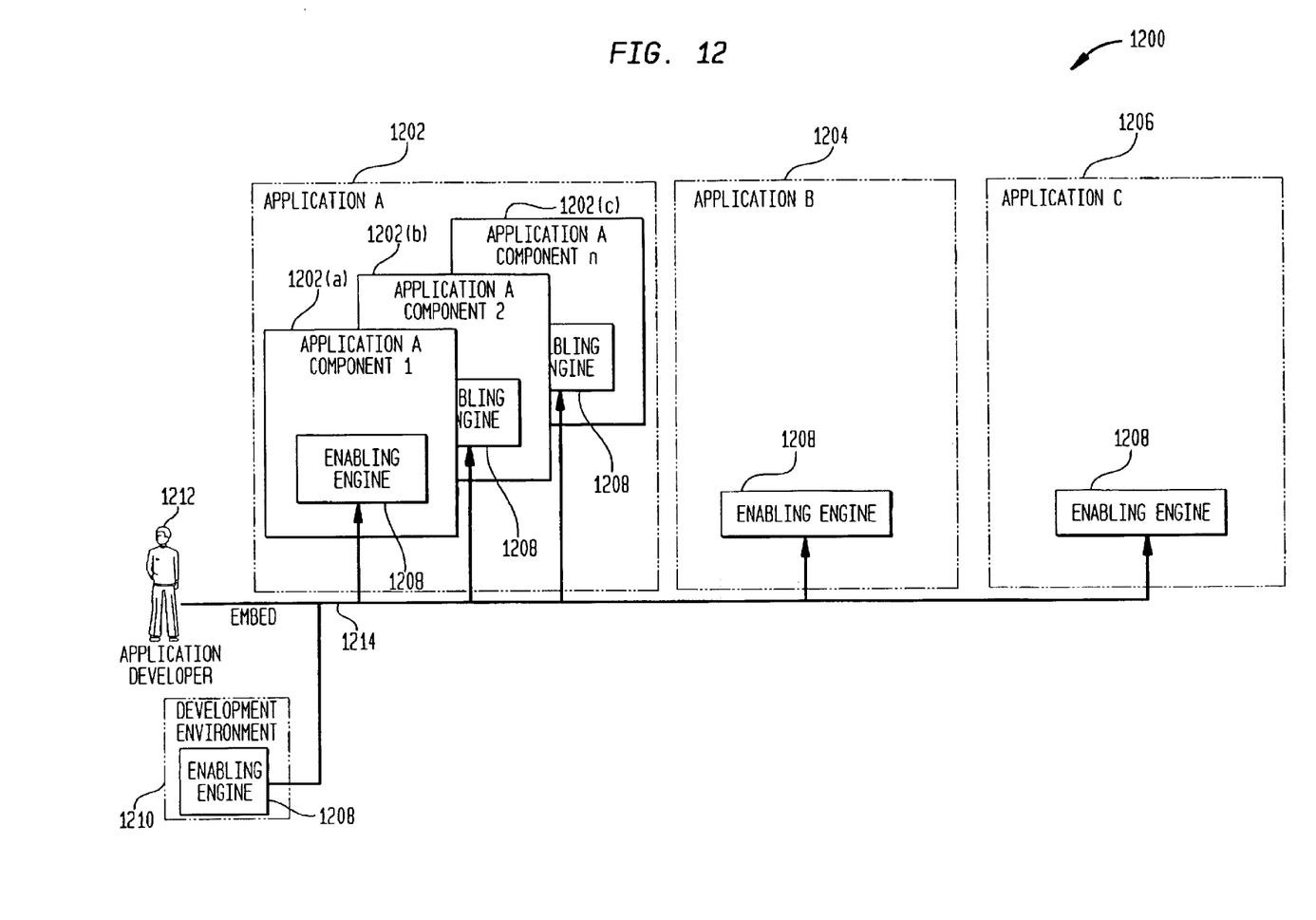
FIG. 12 is an exemplary block diagram of build-time enabling engine embedding into application programs and separately-executable components thereof of the present invention.

FIG. 12 depicts an exemplary system block diagram 1200 at build-time, which depicts embedding of an enabling engine into application programs and separately-executable components. The build-time system depicted in FIG. 12, illustrates exemplary application programs A 1202, B 1204 and C 1206. Further, the build-time system illustrates exemplary separately-executable component1 1202(*a*), component2 1202(*b*), . . . , component-n 1202(*c*) for application program A 1202. It should be noted that the application programs and separately-executable components thereof for system 1200 depicted in FIG. 12 are only exemplary, and that the system depicted 1200 supports a plurality of application programs and components thereof, and is only circumscribed by a particular development environment 1210 within which the present invention is practiced. An enabling engine 1208 according to the principles of the present invention is embedded 1214 by an application program developer 1212 into the exemplary component1 1202(*a*), component2 1202(*b*), . . . , component-n 1202(*c*) for application program A 1202, and into application program B 1204 and C 1206.

Figure 13:
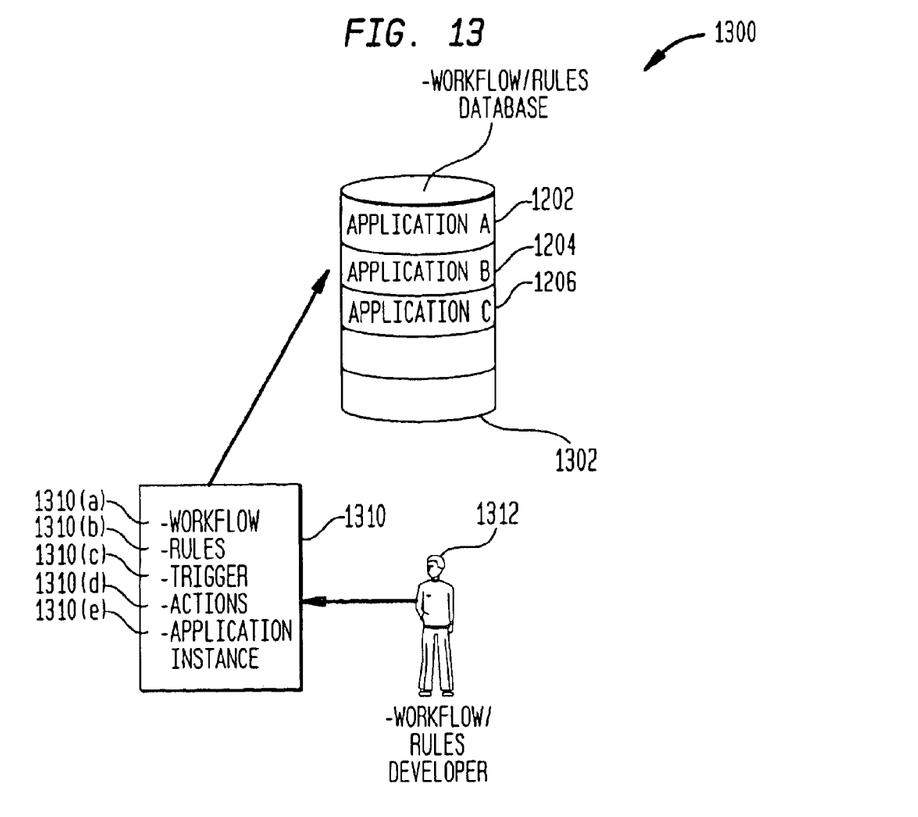
FIG. 13 is an exemplary block diagram of build-time workflow and rules devolvement for the exemplary application programs and separately-executable components thereof depicted in FIG. 12.

FIG. 13 is an exemplary system block diagram at build-time, of workflow and rules devolvement for the exemplary application programs and separately-executable components thereof depicted in the exemplary FIG. 12. As an example, a developer 1312 designs particular associations 1310 for application programs A 1202, B 1204 and C 1206 between workflow(s) 1310(*a*), rule(s) 1310(*b*), trigger(s) 1310(*c*), action(s) 1310(*d*) and application instance(s) 1310(*e*) for facilitating navigation according to the principles of the present invention. These associations are stored and maintained in a "Workflow/Rules" database according to the principles of the present invention, enumerated the figures and the foregoing description of the present invention.

Figure 14:
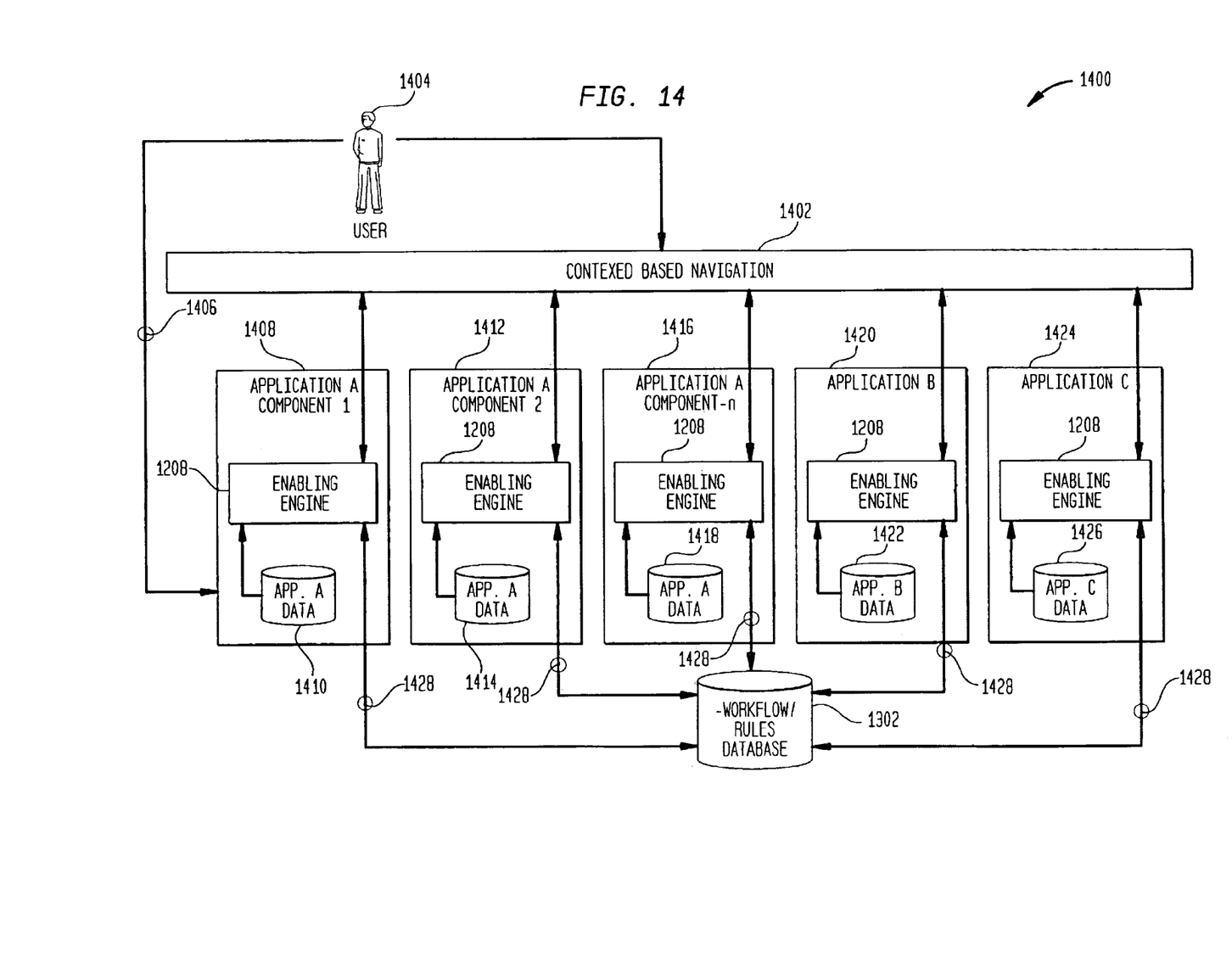
FIG. 14 is an exemplary block diagram depicting run-time navigation between computer application programs and components thereof of the present invention.

FIG. 14 is an exemplary system block diagram depicting run-time navigation between computer application programs and components thereof of the present invention. The exemplary programs and components involved in the run-time navigation of FIG. 14 have been embedded with an enabling engine in FIG. 12 according to the principles of the present invention. Additionally, workflows and rules with all particular associations have likewise been designed and maintained in a "Workflow/Rules" database 1302 in FIG. 13 according to the principles of the present invention. Exemplary system block diagram 1400 of FIG. 14, depicts a user 1404, who instantiates 1406 an application program A, component1 1408 for navigation according to the principles of the present invention. Application A, component1 is embedded with an enabling engine 1208 and manages data 1410. The application instance invokes the embedded enabling engine 1208, which interrogates 1428 a "Workflow/Rules" database 1302 that contains rules that are available to the application instance 1408, and retrieves these rules. Then, the embedded enabling engine executes the rules thus retrieved against the application instance data 1410 and determines which rules are valid. Furthermore, the enabling engine queries both the state data for the user 1404 and the role data for the application instance 1408. Additionally, the enabling engine determines the user's 1404 network connectivity status. Thereafter, based on all foregoing factors, the enabling engine 1208 displays available exemplary navigation points 1412., 1424 via graphical interface 1402. The user 1404 can select a navigation point from the graphical interface 1402. Upon user selection, the enabling engine executes actions for the selected navigation point and navigates to the selected destination. The application programs and components thereof, which are represented by the navigation points thus displayed 1412, . . . , 1424 manage their respective data 1414, . . . , 1426 and are embedded with their respective enabling engine 1208 that is enabled to query and retrieve 1428 rules and actions from database 1302 for further navigation according to the principles of the present invention enumerated in the foregoing description.

While it is apparent that the invention herein disclosed is well calculated to fulfill the aforementioned objects, it will be appreciated that numerous modifications and embodiments may be devised by those skilled in the art, and it is intended that the appended claims cover all such modifications and embodiments as fall within the true spirit and scope of the present invention.

Having thus described out invention, what we claim as new, and desire to secure by Letters Patent is:

1. A method for navigating between two or more application programs, each application program capable of being instantiated to form an application program instance, the method comprising:

(a) embedding an enabling engine in an origin application program and instantiating the origin application program to provide an origin application program instance;

(b) invoking the enabling engine for the origin application program instance, wherein the enabling engine is responsive to the origin application program instance for enabling navigation;

(c) interrogating a rule-base and retrieving at least one condition associated with the origin application program instance;

(d) utilizing the at least one condition to query and evaluate data managed by the origin application program instance; and (e) establishing and displaying at least one navigation path to a user for navigating to at least one target application program, which is different than the origin application program:

where the at least one navigation path is displayed via a graphical display by utilizing the queried and evaluated data.

2. The method of claim 1, further comprising:

enabling the user to select a navigation path from the at least one navigation path thus displayed.

3. The method of claim 1, wherein the rule-base includes at least one action associated with the origin application program instance, the method further comprising:

responsive to the user selection of the navigation path, instantiating the target application program to provide a target application program instance and navigating to the target application program instance by utilizing the at least one action.

4. The method of claim 3, further comprising:

performing remaining actions from the at least one action that are not utilized for executing functionality supported by the target application program instance.

5. The method of claim 4, wherein the functionality supported by the target application program comprises displaying a particular web page.

6. The method of claim 1, further comprising:

storing and retaining a navigation path associated with the origin application program instance.

7. The method of claim 6, further comprising:

enabling the user to navigate backwards from the target application program instance to the origin application program instance by displaying the navigation path associated with the origin application program instance via the graphical display.

8. The method of claim 1, wherein the step of establishing and displaying the at least one navigation path further comprises:

evaluating the at least one navigation path based on (a) state data managed by the origin application program instance and (b) a role of the user.

9. The method of claim 1, wherein the target application program comprises a web browser.

10. The method of claim 1, wherein the rule-base resides on a network.

11. The method of claim 1, wherein the rule-base resides locally on the user's system.

12. The method of claim 1, wherein the target application program resides locally on the user's system.

13. The method of claim 1, wherein the target application program resides on a network.

14. The method of claim 1, wherein the at least one navigation path comprises a workflow for sequentially performing tasks.

15. A system for navigating between two or more application programs, each program capable of being instantiated to form a program instance having data associated therewith, the system comprising:

(a) a rule-base for storing at least one condition associated with an origin application program instance;

(b) an enabling engine embedded in the origin application program instance and responsive to the origin application program instance for interrogating the rule-base and retrieving the at least one condition;

(c) the enabling engine including a mechanism for utilizing the at least one condition to querying and evaluate data managed by the origin application program instance and, utilizing the queried and evaluated data, establish at least one navigation path for navigation to at least one target application program, which is different than the origin application program; and (d) a display for displaying the at least one navigation path to a user.

16. The system of claim 15, wherein the display enables the user to select a navigation path from the at least one navigation path thus displayed.

17. The system of claim 15, wherein the rule-base includes at least one action associated with the origin application program instance, and the enabling engine further comprises:

means for instantiating a target application program to provide a target application program instance, responsive to the user selection of the navigation path; and means for navigating to the target application program instance by utilizing the at least one action.

18. The system of claim 17, the system further comprising:

means for performing remaining actions from the at least one action that are not utilized for executing functionality supported by the target application program instance.

19. The system of claim 17, wherein the target program comprises a web browser.

20. The system of claim 18, wherein the functionality supported by the target application program comprises displaying a particular web page.

21. The system of claim 15, the system further comprising:

means for storing and retaining a navigation path associated with the origin application program instance.

22. The system of claim 21, the system further comprising:

means for enabling the user to navigate backwards from the target application program instance to the origin application program instance by displaying the navigation path associated with the origin application program instance via the display.

23. The system of claim 15, the system further comprising:

means for evaluating the at least one navigation path based on (a) state data managed by the origin application program instance and (b) a role of the user.

24. The system of claim 15, wherein the rule-base resides on a network.

25. The system of claim 15, wherein the rule-base resides locally on a user's computer system.

26. The system of claim 15, wherein the target application program resides locally on a user's computer system.

27. The system of claim 15, wherein the target application program resides on a network.

28. The system of claim 15, wherein the at least one navigation path comprises a workflow for sequentially performing tasks.

29. A program storage device readable by a machine, tangibly embodying a program of instructions executable by the machine to perform a method for navigating between two or more application programs, each application program capable of being instantiated to form an application program instance, the method comprising:

(a) embedding an enabling engine in an origin application program and instantiating the origin application program to provide an origin application program instance;

(b) invoking the enabling engine for the origin application program instance, wherein the enabling engine is responsive to the origin application program instance for enabling navigation;

(c) interrogating a rule-base and retrieving at least one condition associated with the origin application program instance;

(d) utilizing the at least one condition to query and evaluate data managed by the origin application program instance; and (e) establishing and displaying at least one navigation path to a user for navigating to at least one target application program, which is different than the origin application program;

where the at least one navigation path is displayed via a graphical display by utilizing the queried and evaluated data.

30. The program storage device of claim 29, wherein the method further comprises enabling the user to select a navigation path from the at least one navigation path thus displayed.

31. The program storage device of claim 29, wherein the rule-base includes at least one action associated with the origin application program instance, and the method further comprises:

responsive to the user selection of the navigation path, instantiating a target application program to provide a target application program instance and navigating to the target application program instance by utilizing the at least one action.

32. The program storage device of claim 31, wherein the method further comprises:

performing remaining actions from the at least one action that are not utilized for executing functionality supported by the target application program instance.

33. The program storage device of claim 32, wherein the functionality supported by the target application program comprises displaying a particular web page.

34. The program storage device of claim 29, wherein the method further comprises:

storing and retaining a navigation path associated with the origin application program instance.

35. The program storage device of claim 34, wherein the method further comprises:

enabling the user to navigate backwards from the target application program instance to the origin application program instance by displaying the navigation path associated with the origin application program instance via the graphical display.

36. The program storage device of claim 29, wherein the step of establishing and displaying the at least one navigation path further comprises:

evaluating the at least one navigation path based on (a) state data managed by the origin application program instance and (b) a role of the user.

37. The program storage device of claim 29, wherein the target application program comprises a web browser.

38. The program storage device of claim 29, wherein the rule-base resides on a network.

39. The program storage device of claim 29, wherein the rule-base resides locally on the user's system.

40. The program storage device of claim 29, wherein the target application program resides locally on the user's system.

41. The program storage device of claim 29, wherein the target application program resides on a network.

42. The program storage device of claim 29, wherein the at least navigation path comprises a workflow for sequentially performing tasks.

* * * * *